(12) United States Patent
Ferdi et al.

(10) Patent No.: US 12,238,516 B2
(45) Date of Patent: Feb. 25, 2025

(54) METHODS AND APPARATUSES FOR SLICE-SPECIFIC AUTHENTICATION

(71) Applicant: InterDigital Patent Holdings, Inc., Wilmington, DE (US)

(72) Inventors: Samir Ferdi, Kirkland (CA); Ulises Olvera-Hernandez, Montreal (CA); Guanzhou Wang, Brossard (CA); Saad Ahmad, Montreal (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 569 days.

(21) Appl. No.: 17/421,302

(22) PCT Filed: Jan. 3, 2020

(86) PCT No.: PCT/US2020/012220
§ 371 (c)(1),
(2) Date: Jul. 7, 2021

(87) PCT Pub. No.: WO2020/146211
PCT Pub. Date: Jul. 16, 2020

(65) Prior Publication Data
US 2022/0007184 A1    Jan. 6, 2022

Related U.S. Application Data

(60) Provisional application No. 62/825,159, filed on Mar. 28, 2019, provisional application No. 62/806,190, (Continued)

(51) Int. Cl.
*H04W 12/06* (2021.01)
*H04L 9/40* (2022.01)
(Continued)

(52) U.S. Cl.
CPC ......... *H04W 12/06* (2013.01); *H04L 63/0892* (2013.01); *H04W 48/16* (2013.01); *H04W 60/04* (2013.01)

(58) Field of Classification Search
CPC ..... H04W 12/06; H04W 48/16; H04W 60/04; H04W 12/009; H04W 12/08; H04W 48/18; H04L 63/0892; H04L 63/10
See application file for complete search history.

(56) References Cited

U.S. PATENT DOCUMENTS

2014/0321406 A1    10/2014  Marinier et al.
2018/0227871 A1*    8/2018  Singh .................... H04W 48/18
(Continued)

FOREIGN PATENT DOCUMENTS

EP            3358887 A1     8/2018
KR       20180136171 A      12/2018
(Continued)

OTHER PUBLICATIONS

Anonymous, "Introduction of Network Slice-specific Secondary authentication", 3rd Generation Partnership Project (3GPP), 3GPP Tdoc S2-1901746, 3GPP TSG-SA WG2 Meeting #131, Tenerife, Spain, Feb. 25, 2019, 5 pages.
(Continued)

*Primary Examiner* — Michael R Vaughan
(74) *Attorney, Agent, or Firm* — Volpe Koenig

(57) ABSTRACT

A method for slice authentication in a mobile telephone network. A WTRU performs, during a registration procedure with an Access and Mobility management Function, AMF, of a network, primary authentication of the WTRU, during which registration procedure the WTRU receives from the AMF a message indicating successful registration and including at least one of an indication of at least one network slice-specific authentication and authorization for slice
(Continued)

access, SSSA, procedure to be executed following the registration procedure, a list of slices for which the WTRU is allowed access, and a list of slices for which SSSA is needed for access by the WTRU, and performs, after successful registration, at least one SSSA of the WTRU for accessing a first slice in the network.

29 Claims, 11 Drawing Sheets

Related U.S. Application Data filed on Feb. 15, 2019, provisional application No. 62/791,224, filed on Jan. 11, 2019.

(51) Int. Cl.
H04W 48/16 (2009.01)
H04W 60/04 (2009.01)

(56) References Cited

U.S. PATENT DOCUMENTS

| | | | |
|---|---|---|---|
| 2018/0317086 A1* | 11/2018 | Ben Henda | H04W 12/068 |
| 2018/0317157 A1 | 11/2018 | Baek et al. | |
| 2018/0324577 A1 | 11/2018 | Faccin et al. | |
| 2018/0343249 A1* | 11/2018 | Hahn | H04L 63/0869 |
| 2019/0037409 A1* | 1/2019 | Wang | H04W 88/14 |
| 2020/0178196 A1* | 6/2020 | Wang | H04W 60/005 |
| 2021/0067944 A1* | 3/2021 | Faccin | H04W 36/0079 |
| 2021/0153006 A1 | 5/2021 | Kim et al. | |
| 2023/0139780 A1* | 5/2023 | Kunz | H04L 63/0892 726/7 |
| 2023/0300733 A1* | 9/2023 | Casati | H04W 60/00 370/329 |

FOREIGN PATENT DOCUMENTS

| | | |
|---|---|---|
| RU | 2654052 C2 | 5/2018 |
| TW | 201831038 A | 8/2018 |
| TW | 201844032 A | 12/2018 |
| WO | WO 2018171863 A1 | 9/2018 |

OTHER PUBLICATIONS

Anonymous, "Comments on contribution S3-161789 that proposes secondary authentication in the slice as the only means of authenticating UE's access to a network slice", 3rd Generation Partnership Project (3GPP), 3GPP Tdoc S3-161961, 3GPP TSG SA WG3 (Security) Meeting #85, Santa Cruz de Tenerife, Spain, Nov. 7, 2016, 6 pages.

Anonymous, "Clarification on update of network slice configuration", 3rd Generation Partnership Project (3GPP), 3GPP Tdoc S2-184910, 3GPP TSG-SA WG2 Meeting #127bis, Newport Beach, California, USA, May 28, 2018, 2 pages.

Anonymous, "UE security capability for the Slice-Specific Secondary Authentication and Authorization", 3rd Generation Partnership Project (3GPP), 3GPP Tdoc S2-1811169 (updated revision of S2-1810110), SA WG2 Meeting #129, Dongguan, P.R. China, Oct. 15, 2018, 7 pages,.

Anonymous, "Section 5.6.3.3.1, Key Issue Details.", 3rd Generation Partnership Project (3GPP), 3GPP Tdoc S3-171598 (revision of S3-171048), 3GPP TSG SA WG3 (Security) Meeting #87, Ljubljana, Slovenia, May 15, 2017, 9 pages.

Anonymous, "Study on Enhancement of Network Slicing (Release 16)", 3rd Generation Partnership Project (3GPP), Technical Specification Group Services and System Aspects, 3GPP TR 23.740 V0.7.0, Dec. 2018, 71 pages.

Anonymous, "Security architecture and procedures for 5G system"(Release 15), 3rd Generation Partnership Project, Technical Specification Group Services and System Aspects, 3GPP TS 33.501, v15.2.0, Sep. 2018, 175 pages.

Anonymous, "Procedures for the 5G System; Stage 2 (Release 15)", 3rd Generation Partnership Project, Technical Specification Group Services Aspects, 3GPP TS 23.502 V15.3.0, Sep. 2018, 330 pages.

Anonymous, "Introduction of Network Slice-Specific Secondary authentication", 3rd Generation Partnership Project (3GPP), 3GPP Tdoc S2-1902881, 3GPP TSG-SA WG2 Meeting #131, Tenerife, Spain, Feb. 25, 2019, 7 pages.

Anonymous, "Slice-specific Secondary authentication (SSSA)", 3rd Generation Partnership Project (3GPP), 3GPP Tdoc S2-1901747, 3GPP TSG-SA WG2 Meeting #131, Tenerife, Spain, Feb. 25, 2019, 13 pages.

Nokia et al., Draft for network slice specific authentication procedures, 3GPP TSG-SA3 Meeting #97, S3-194541, Reno, US (Oct. 14-18, 2019).

NEC, "UE security capability for the Slice-Specific Secondary Authentication and Authorization," SA WG2 Meeting #129, S2-1810110, Dongguan, P.R. China (Oct. 15-19, 2018).

Third Generation Partnership Project, "Technical Specification Group Services and System Aspects; Study on Enhancement of Network Slicing (Release 16)", 3GPP Standard; Technical Report; 3GPP TR 23.740, V16.0.0, Dec. 19, 2018 (Dec. 19, 2018), pp. 1-70 / Dec. 19, 2018.

Nokia et al., "Evaluation of solution in clause 6.3.2," SA WG2 Meeting #129bis, S2-1813210, West Palm Beach, Florida, USA (Nov. 26-30, 2018).

* cited by examiner

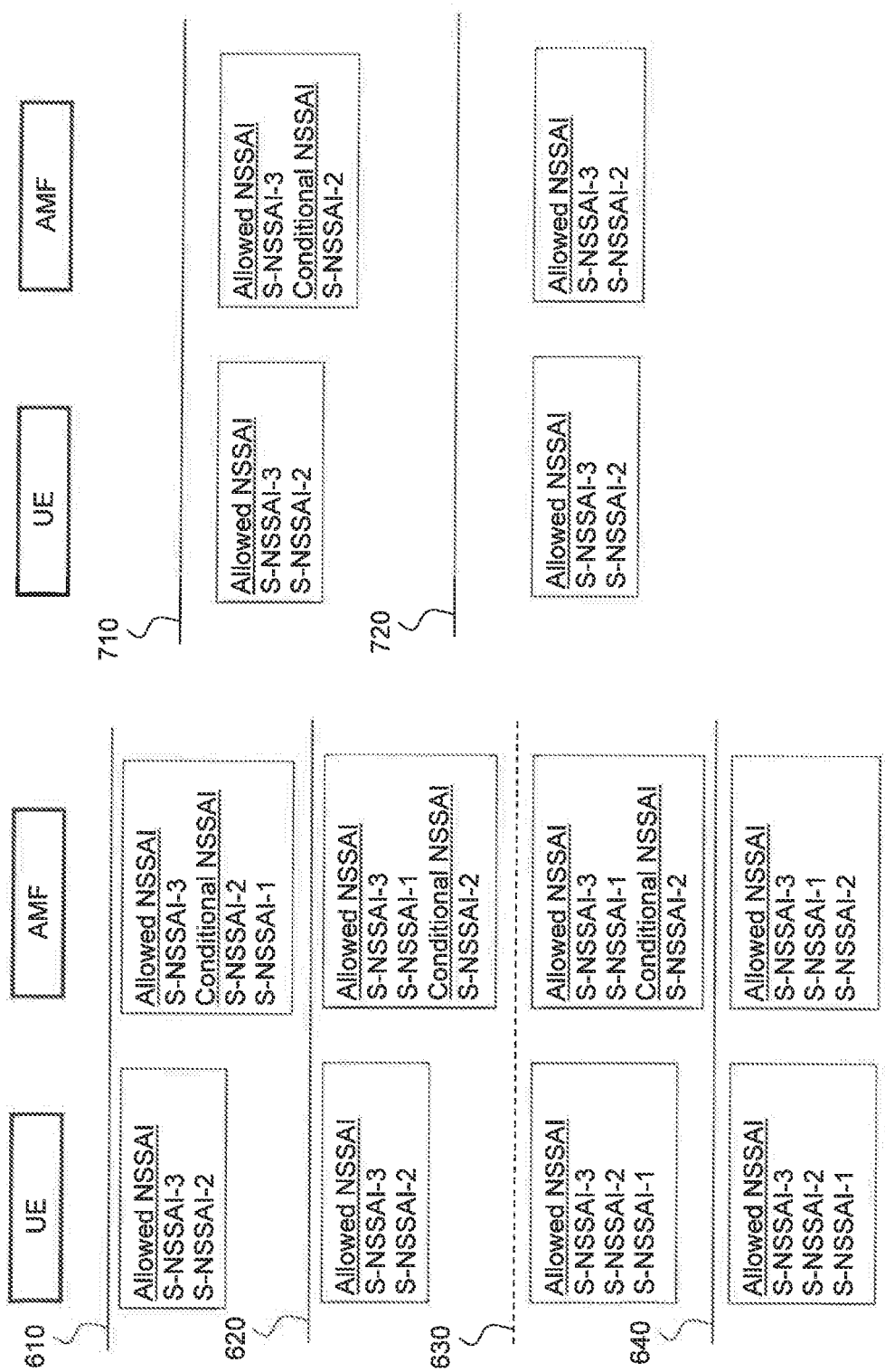

METHODS AND APPARATUSES FOR SLICE-SPECIFIC AUTHENTICATION

CROSS REFERENCE TO RELATED APPLICATIONS

This application claims the benefit, under 35 U.S.C. § 371 of International Application PCT/US2020/012220, filed Jan. 3, 2020, which was published in accordance with PCT Article 21 (2) on Jul. 16, 2020, in English, and which claims the benefit of U.S. Patent Application No. 62/791,224, filed Jan. 11, 2019; United States Patent Application No. 62/806,190, filed Feb. 15, 2019; and U.S. Patent Application No. 62/825,159, filed Mar. 28, 2019.

BACKGROUND

Certain mobile telephony networks may implement the possibility of so-called Network Slicing, wherein a network slice is a self-contained network that is part of a bigger network. A slice can be said to be a logical network that provides specific network capabilities and network characteristics. The 3rd Generation Partnership Project (3GPP) is currently completing a study on Network Slicing enhancements for 3GPP Release 16 [see 3GPP Technical Report (TR) 23.740, "Study on Enhancement of Network Slicing", V0.7.0 (2018-12-06)].

SUMMARY

A method and apparatus for operation by a wireless transmit/receive unit (WTRU) in a network are provided. The method may comprise performing, during a registration procedure with an Access and Mobility management Function, AMF, of a network, primary authentication of the WTRU, during which registration procedure the WTRU receives from the AMF a message indicating successful registration and including at least one of an indication of at least one network slice-specific authentication and authorization for slice access, SSSA, procedure to be executed following the registration procedure, a list of slices for which the WTRU is allowed access, and a list of slices for which SSSA is needed for access by the WTRU, and performing, after successful registration, at least one SSSA of the WTRU for accessing a first slice in the network.

Counterpart method and apparatus for operation by the AMF are also provided. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref.") in the Figures indicate like elements, and wherein:

FIG. 6 illustrates a first solution for updating of Allowed NSSAI in WTRU and AMF;

FIG. 7 illustrates a second solution for updating of Allowed NSSAI in WTRU and AMF;

DETAILED DESCRIPTION

Example Networks for Implementation of the Embodiments

Figure 1A:
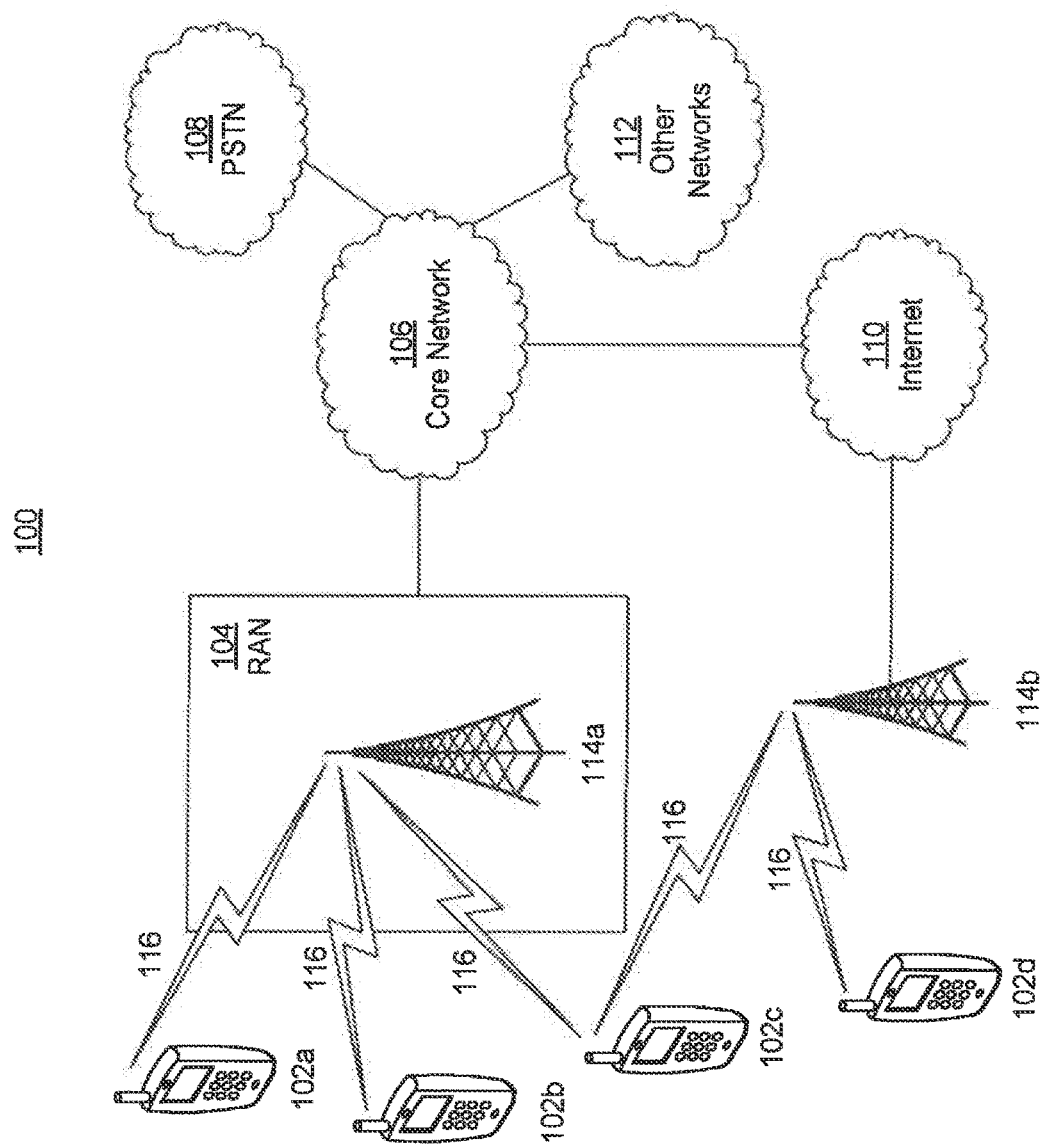
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an eNode-B, a Home Node B, a Home eNode-B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a in the RAN 104 and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a in the RAN 104 and the WTRUs 102a, 102b, 102c may implement a radio technology such as NR Radio Access, which may establish the air interface 116 using New Radio (NR).

In an embodiment, the base station 114a in the RAN 104 and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The other networks 112 may include wired and/or wireless communications networks owned and/or operated by other service providers. For example, the other networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
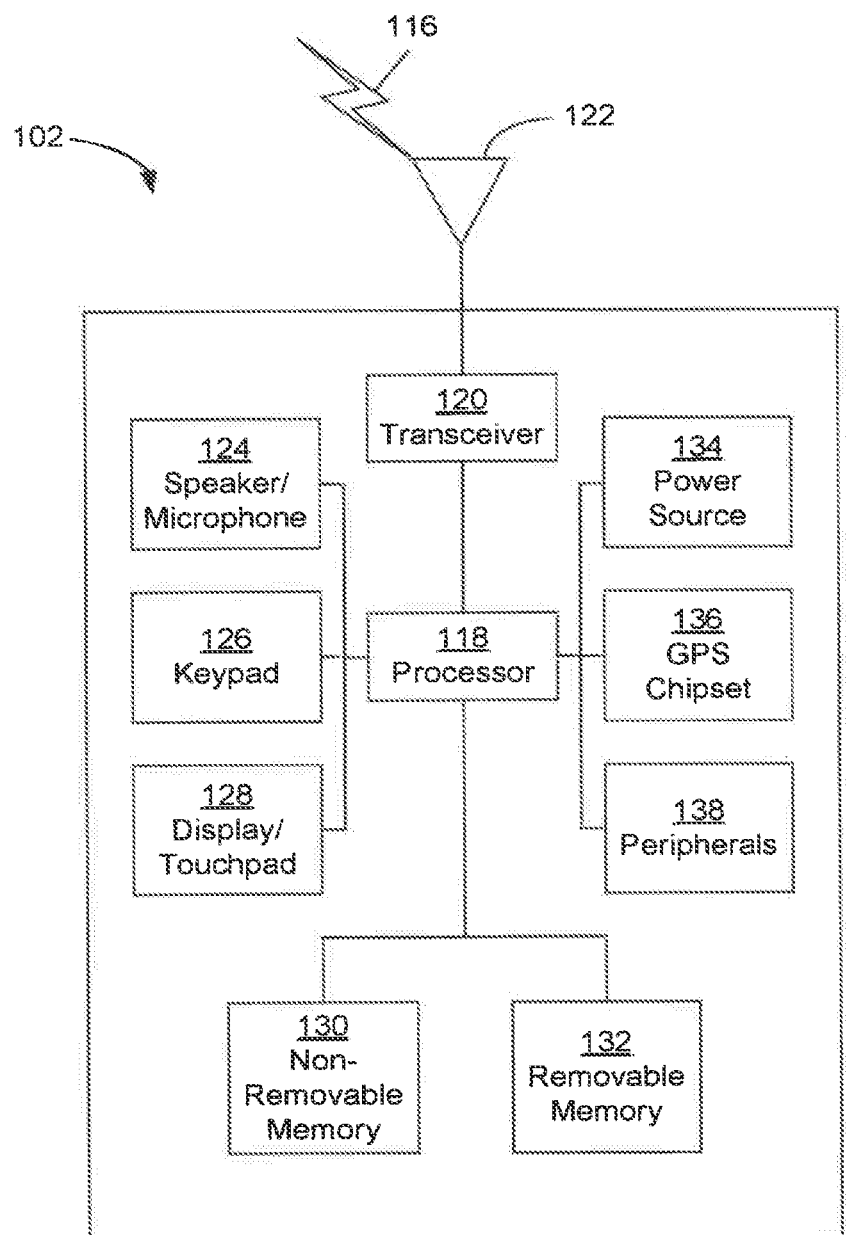
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a chipset 136 for a positioning system such as Global Positioning System (GPS), and/or other elements 138, among others. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a in FIG. 1A) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements 138, which may include one or more software and/or hardware modules that provide additional features, functionality and/or wired or wireless connectivity. For example, the elements 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The elements 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
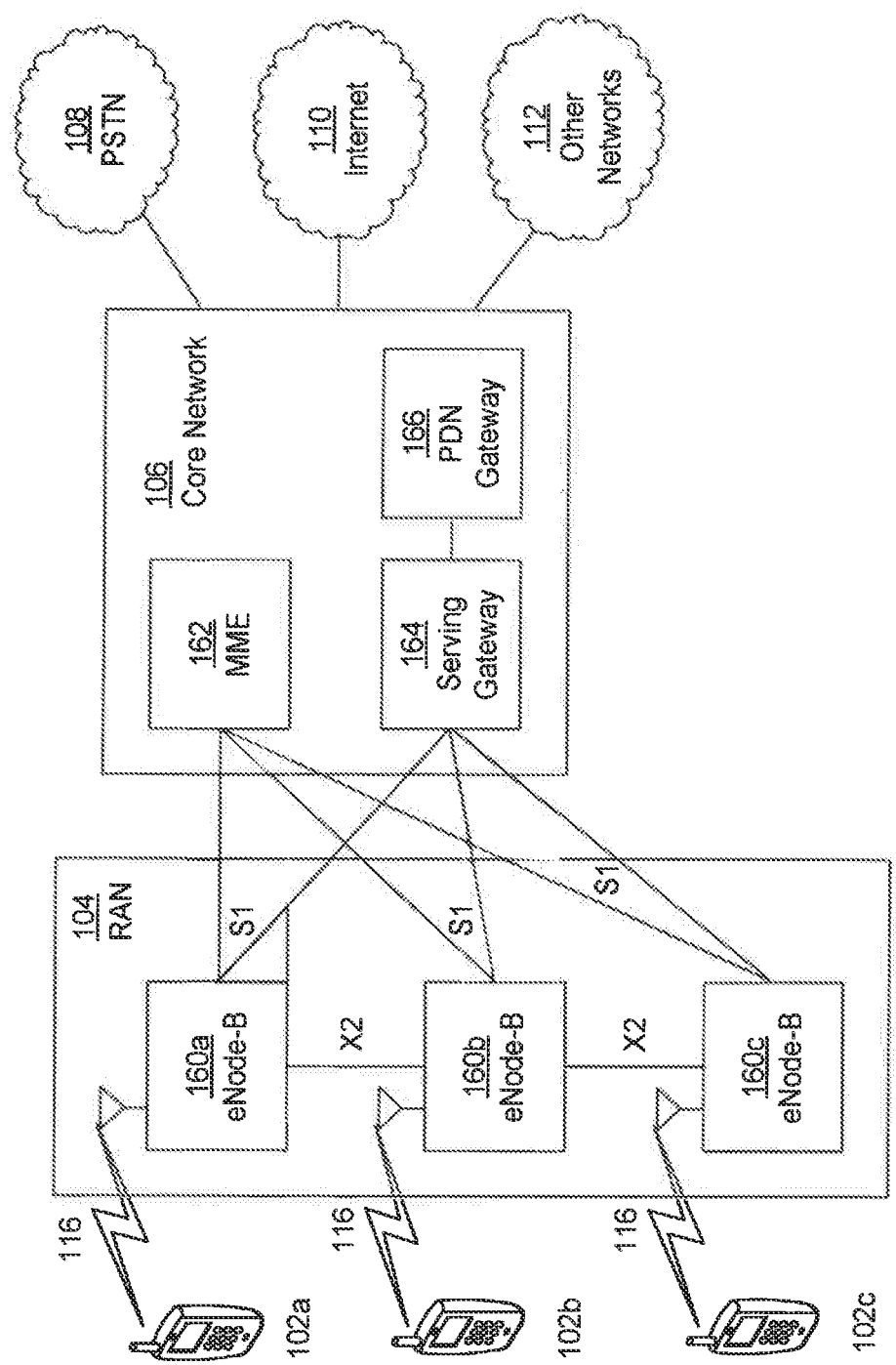
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode-Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
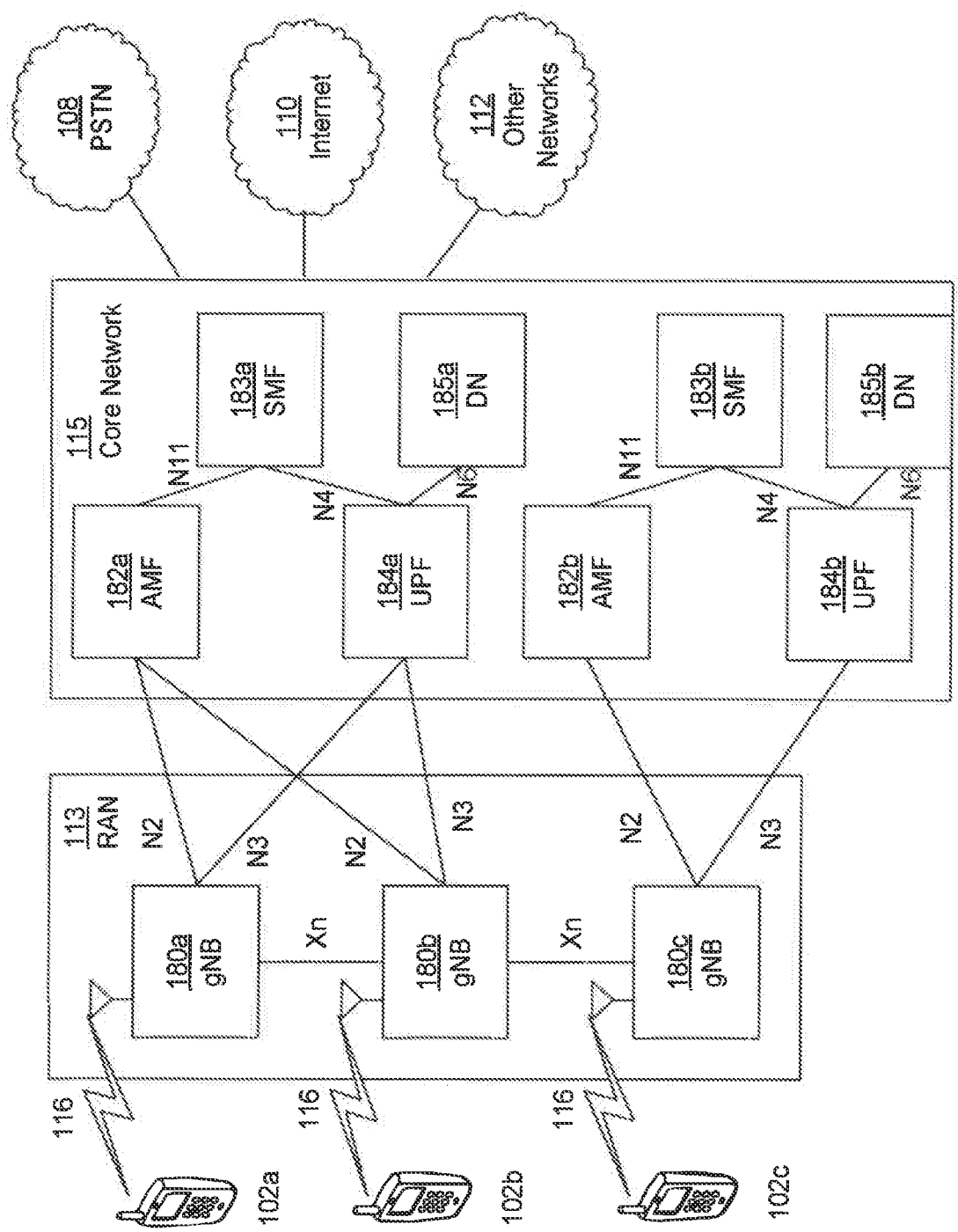
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b, 180c may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers (not shown) to the WTRU 102a. A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c in FIG. 1C). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
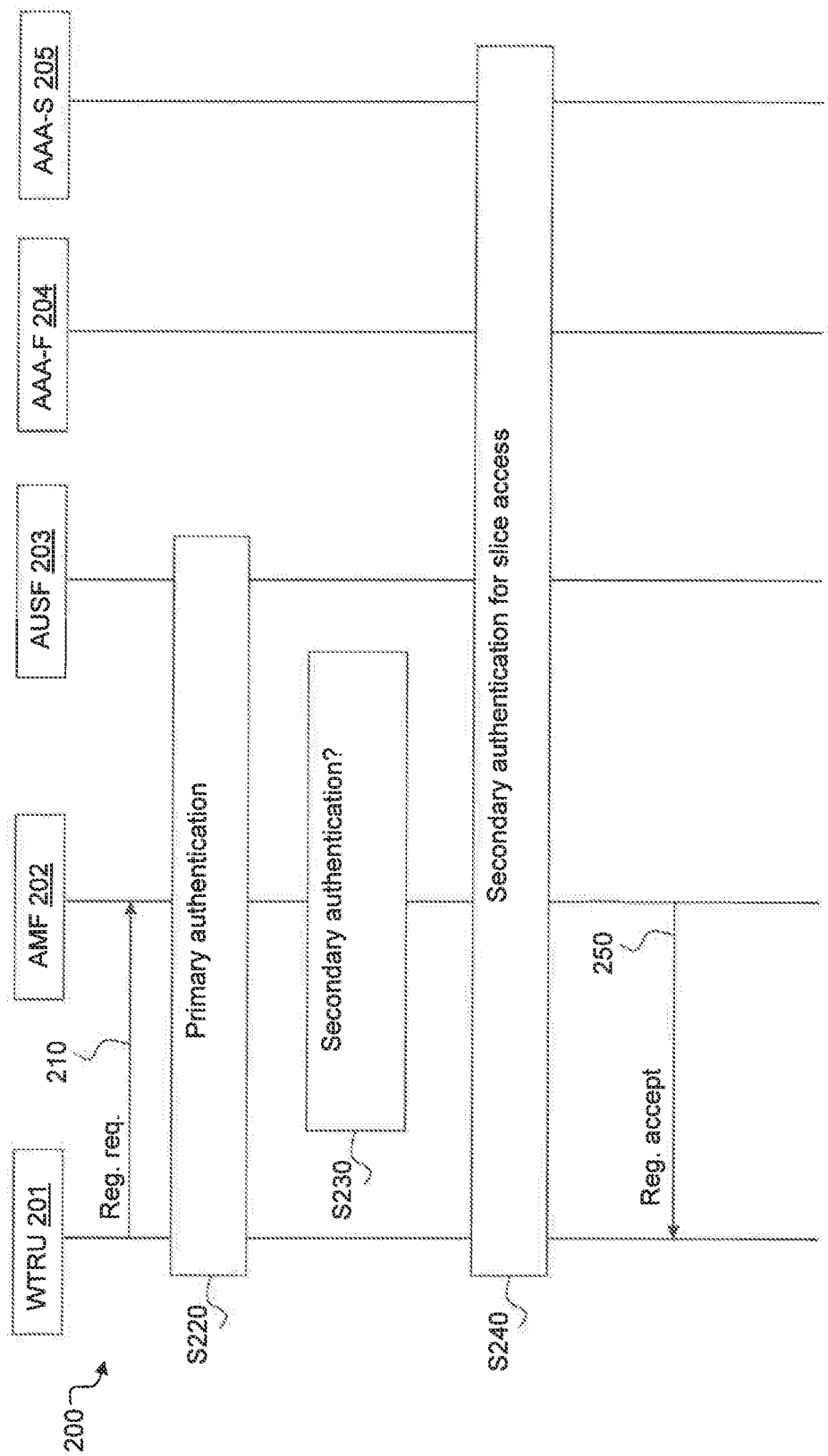
FIG. 2 is a flowchart that illustrates Slice Specific Secondary Authentication (SSSA)

A currently selected solution for Slice Specific Secondary Authentication (SSSA) is illustrated in FIG. 2. In response to a registration request 210, sent from a WTRU 201 to an Anchor Mobility Function (AMF) 202, a mandatory primary authentication for Public Land Mobile Network (PLMN) access is performed, in step S220, with an Authentication Server Function (AUSF) 203. The AMF 202 then checks operator policy, subscription data and security capability of the WTRU 201 to determine, in step S230, whether the WTRU 201 is required to perform an additional level of authentication and/or Slice Specific Secondary Authentication (SSSA) for one or more slices in the network. In this case, the WTRU 201 then performs, in step S240, authentication through the AMF 202 with a third-party Authentication, Authorizing and Accounting (MA) server AAA-S 205 for the slices for which authentication is required. These slices are identified in the registration request 210 using Network Slice Selection Assistance Information (NSSAI)—essentially information about the slices—that may include a plurality of independent Single NSSAI (S-NSSAI), and Extensible Authentication Protocol (EAP) authentication is performed for each thus identified slice that is subject to SSSA. Upon successful authentication, the AMF 202 returns a Registration Accept (or conversely Registration Reject in case of unsuccessful authentication) message 250 to inform the WTRU 201 that it has been successfully authenticated. This completes the Registration procedure.

When interacting with third-party MA servers, there may be EAP problems owing to timeout or other failures, for example owing to EAP retransmissions and lack of response from the third-party MA server. Since all the SSSAs are performed before the Registration Accept message 250 is sent to the WTRU 201, such failures may delay a WTRU access to other slices, in particular to slices for which access is completely under operator control, i.e. S-NSSAIs that do not require SSSA and that therefore could be accessed directly without SSSA. This may have a negative impact on user experience while Registering with the Network.

To implement the method 200, it has been proposed to suspend the Mobility Management (MM) timer (i.e. T3510) in the WTRU when SSSA begins and resume the timer when all pending SSSAs are completed. A flag indicating that SSSA is required for a S-NSSAI is to be maintained in the Unified Data Management (UDM), but it is not specified whether the WTRU has access to this flag in its local NSSAI configuration. Assuming that the WTRU has local access to this flag (e.g. as part of the Configured NSSAI), this would only enable the WTRU to count the "maximum number" of SSSAs that may be performed during the Registration, but this "maximum number" is not necessarily the same as the "actual number" of SSSAs that is required by the Network. For example, SSSA may be required for an S-NSSAI according to subscription information but may not be allowed by the Network based on operator policy (e.g. for a current Registration area). If so, the Network may skip the SSSA for that S-NSSAI resulting in the WTRU expecting one more SSSA than needed and the WTRU would therefore fail to resume the MM timer during the Registration procedure. A possible consequence may be a MM stale state at the WTRU, for example following a failure to receive a Registration Accept/Reject message. When using EAP procedure nested in the Registration procedure, the WTRU should be able to resume deterministically the MM timer for proper MM state management. Suspending the MM timer when SSSA starts and resuming the MM timer in the WTRU based on an expected maximum number of SSSAs is thus not sufficient. Indeed, as resumption of the timer at least in some cases can be arbitrary, suspending the timer can be said to be practically equivalent to not using the timer at all.

As will be appreciated from the above, the need for a more robust handling of the MM Timer and EAP timer interactions could require a more complex MM state management in the WTRU, which may necessitate modifications to the Registration procedure shown in FIG. 2. It would hence be desirable to support a message flow that addresses the problems related to EAP timers and MM timers interaction to minimize the impact on this Registration procedure.

Further, in the method in FIG. 2, a SSSA procedure can be performed for a particular slice even if the WTRU will not connect to that slice. This leads to inefficiencies and to the needless consumption of radio resources, battery power and network resources. It could thus be desirable to support performing SSSA strictly when needed by the WTRU to avoid potentially wasteful EAP messaging, in other words, support for SSSA on demand.

In addition, the WTRU may need to register for both 3GPP access and non-3GPP access (e.g. to any of WLAN and Fixed Broadband Access) requesting the same S-NSSAI, which may be subject to SSSA. This may be the case if, for example, the WTRU is to use services from the slice through both 3GPP and non-3GPP access (or alternate between through one and through the other).

However, the Registration procedures for different types of access, for example 3GPP and non-3GPP access, are independent and the WTRU would typically also need to perform separate SSSAs for the same S-NSSAI for both 3GPP and non-3GPP access. If a Registration procedure is executed through a particular type of access ("access type") (e.g. 3GPP access), then the WTRU might not be allowed to (e.g. is not allowed to) attempt a Registration procedure for another access type (e.g. non-3GPP) until the current Registration procedure is concluded. The WTRU may maintain separate Allowed NSSAI lists for each access type, e.g. one list for 3GPP and another list for non-3GPP. This separate registration and authentication may for instance be performed as follows: the WTRU that needs to connect to 3GPP access and non-3GPP access, first performs 3GPP registration (i.e. the corresponding S-NSSAI is in the Requested NSSAI, which includes S-NSSAI that requires SSSA) and then includes the same S-NSSAI in the Registration over non-3GPP. In that case, it is however to be specified how the WTRU is to behave when the Requested NSSAI list for registration over non-3GPP is sent in the non-3GPP Registration Request message. More generally, it might not be (e.g. is not) determined how the WTRU should behave when SSSA is needed for the same S-NSSAI for different types of access.

It could be desirable for the WTRU and the network to avoid performing SSSA for a S-NSSAI a second time (e.g. for non-3GPP) if the WTRU has already been successfully authenticated for that S-NSSAI a first time for a different type of access (e.g. 3GPP).

Figure 3:
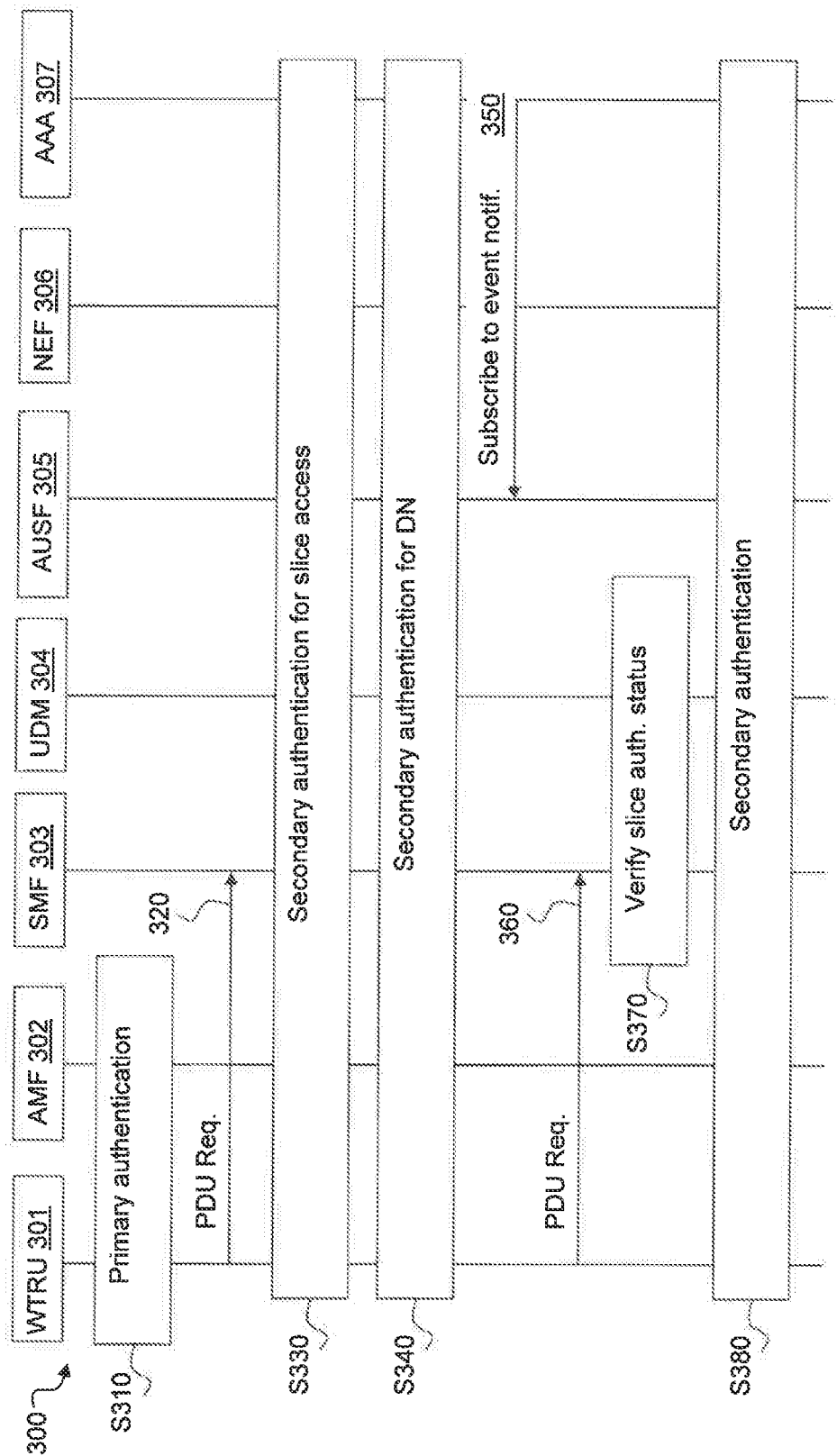
FIG. 3 is a flowchart that illustrates an alternate method for SSSA.

An alternative method for SSSA has been proposed in 3GPP TR 23.740. FIG. 3 is a flowchart for this method 300. Briefly speaking, the method 300 proposes to re-use the existing secondary authentication performed by a Data Network MA Server at the establishment of a Protocol Data Unit (PDU) Session procedure as specified in 3GPP TS 23.502, "Procedures for the 5G System", V15.3.0 and in 3GPP TS 33.501, "Security Architecture and Procedures for 5G System", v15.2.0. However, in contrast to the method described in FIG. 2, a WTRU is not required to perform SSSA for a slice until the WTRU requires connectivity to the slice (i.e. SSSA on demand via PDU Session establishment).

In step S310, the WTRU 301 performs UE registration with the AMF 302, which includes primary authentication with the AUSF 305. The WTRU 301 then sends a PDU Session Establishment Request 320 to the Session Management Function (SMF) 303, which triggers secondary authentication for the slice, the secondary authentication involving the WTRU 301, the SMF 303, the UDM 304 and the AAA-S 307. Secondary authentication may also be performed, in step S340, for the Data Network (DN), the authentication involving the same entities as in step S330. The AM-S 307 may then subscribe to event notification 350 (e.g. change of PDU Session Anchor (PSA)) with the AUSF 305.

The WTRU 301 may then access the slice and the DN before requiring access to a further slice. Alternatively, the WTRU 301 may need to re-authenticate for the slice of step S330. The WTRU 301 sends an additional PDU Session Establishment Request 360 to the SMF 303 that, in step S370, verifies the slice authentication status with the UDM 304. In response to the verification, the WTRU 301 may need to perform secondary authentication with the entities mentioned in step S330.

It may happen that this method does not prevent slice access (which includes the AMF) to a WTRU that uses a service that does not require a PDU Session establishment (e.g. when the WTRU 301 sends SMS over NAS following a Registration Procedure).

Slice-Specific Authentication and Authorization

Figure 4:
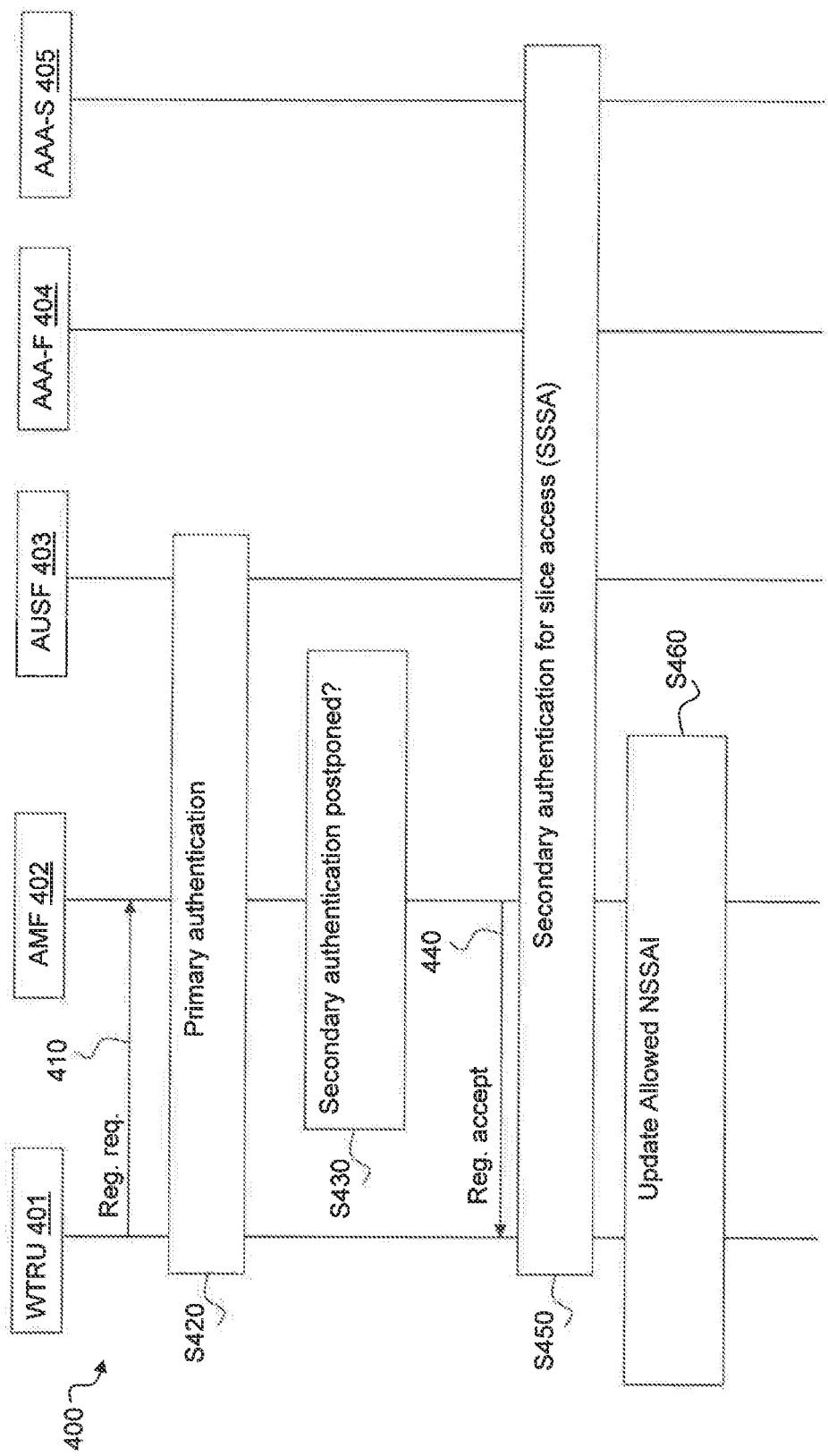
FIG. 4 is a flowchart for an authentication method according to an embodiment.

FIG. 4 illustrates a flowchart for an authentication method 400 according to an embodiment. It will be appreciated that the method 400 can improve issues related to EAP timers and MM timer interaction by allowing the Network to postpone the execution of EAP procedures until after the Registration procedure during which the primary authentication is performed. By postponing EAP procedures for SSSA to after Registration, the method can make it possible for the WTRU to continue to run the MM timer without suspension.

A WTRU 401 may send a registration request 410 to an AMF 402 in which it indicates a preference to perform slice authentication following the Registration procedure or during the Registration procedure. For example, a WTRU with only one slice requiring SSSA may indicate its preference for SSSA to be performed during the Registration procedure rather than after. In this case, the method would then effectively fall back on the method illustrated in FIG. 2 with nested EAP procedure in Registration procedure (if allowed by policy). The indication whether to postpone SSSA until after the Registration procedure may be global for the WTRU (i.e. WTRU provides a single value for all S-NSSAI that may be subject to SSSA in the Requested NSSAI) or on a per individual slice basis (i.e. one value per each S-NSSAI subject to SSSA). For example, the WTRU may use a global indication if the WTRU does not a priori (e.g. from the Configured NSSAI) have knowledge of which specific S-NSSAIs are subject to SSSA. The WTRU may also indicate as part of its capabilities whether it supports running SSSA for multiple S-NSSAI in parallel (i.e. concurrently) or only sequentially (e.g. on a constrained device). A WTRU may present the S-NSSAI requiring SSSA in priority order in the Requested NSSAI so that the SSSA procedures for all applicable S-NSSAI are executed in the order of appearance of the S-NSSAI in a Requested NSSAI list. The indication to signal whether SSSA is to be performed during or after the Registration procedure may be provided as a separate Information Element (IE) or included as part of the WTRU Security Capabilities.

In step S420, the WTRU 401 and the network—AMF 402 and AUSF 403—perform mandatory primary authentication steps, as described with reference to step S220 in FIG. 2.

In case the primary authentication is not successful, the AMF 402 may send (not shown) a Registration Reject message to the WTRU 401, after which the method ends.

In the case of successful primary authentication, the AMF 402 determines, in step S430, for each S-NSSAI subject to SSSA among the NSSAI in the registration request 410, whether or not to postpone EAP procedures to be performed after the Registration procedure. The determination may be based on one or more of the following:

a. WTRU Security Capabilities, such as for example SSSA capability (Yes/No), the EAP methods supported by the WTRU, whether the WTRU supports parallel and/or sequential authentication). It is noted that the WTRU indication in the Registration request 410 may be included in the WTRU Security Capabilities that always are sent to the AMF.
b. S-NSSAI subscription information (e.g. flag for SSSA required: ON/OFF)
c. Operator policy (e.g. run all or part of SSSA procedures during or after Registration procedure). If a S-NSSAI priority order policy is enforced on the WTRU/Network, the AMF 402 may use the ordered Requested NSSAI list to perform split SSSA. In such cases, one or more SSSAs may be performed during the Registration procedure, while one or more other SSSAs may be performed afterwards. For example, SSSA for the S-NSSAIs at the top of the list may be executed during the Registration procedure, while the SSSA for the S-NSSAIs at the bottom of the list may be run afterwards. An alternative priority order for SSSA may be based on a priority order and/or grouping by the AAA-S servers 405 handling the SSSA for their respective S-NSSAI(s). For example, an AM-S server 405 in charge of SSSA for a first set of S-NSSAI may be prioritized over another MA-S server in charge of SSSA for another set of S-NSSAI. In this case, SSSA for the first set of S-NSSAI may performed before the SSSA for the second set of S-NSSAI (e.g. SSSA for the first set of S-NSSAI may be performed during Registration procedure, whereas SSSA for the second set of S-NSSAI may be performed after the Registration procedure). Further, the subscription and/or network policy may enforce limits on the number of allowed S-NSSAI for which SSSA could be run for a WTRU (e.g. maximum number of SSSA possible, during Registration and/or in total).

In other words, in step S430, the AMF 402 determines if all the SSSA for the requested NSSAI are to be performed during the Registration procedure—which then is akin to the method 200 in FIG. 2—or if at least one SSSA may be performed afterwards.

If at least one SSSA is to be performed during the Registration procedure, the required SSSAs are performed, following step S430, these SSSAs involving the WTRU 401 and, typically, the AMF 402 and an MA-S 405.

If the primary authentication is successful, the AMF 402 sends to the WTRU 401 a Registration Accept message 440 that may include:

an indication of allowed NSSAI, i.e. NSSAI for which successful SSSA has been performed and NSSAI for which no SSSA is required. This indication may exclude the S-NSSAI for which a SSSA needs to be run after the Registration procedure (in order for the WTRU 401 to access the NSSAI); and an indication of follow-on SSSA(s) to be executed (if at all) after the WTRU 401 sends a Registration complete message (in response to the Registration accept message 440). This indication may include a list (or set) of S-NSSAIs for which SSSA may be run at a later time (e.g. in priority order), and which may be referred herein as any of "Conditionally Allowed NSSAI," "Conditionally Allowed NSSAI list," "Conditionally Allowed NSSAI set" etc.

Alternatively, the Registration Accept message 440 can include:

an indication of allowed NSSAI also including the S-NSSAI for which there is a SSSA that needs to be run after the Registration procedure; and an indication of follow-on SSSA(s) to be executed (if at all) after the WTRU sends the Registration complete message. This indication information may include a list of S-NSSAIs for which SSSA may be run at a later time (e.g. in priority order), e.g. Conditionally Allowed NSSAI.

Instead of or in addition to a list of follow-on SSSA(s) to be executed (if any), the Registration Accept message 440 may include a number of S-NSSAIs for which SSSA will be performed before use. The number may be used by the WTRU 401 to determine when all expected SSSA runs are completed (e.g. the WTRU may determine that all SSSA runs are completed when the WTRU after the Registration procedure receives a number of EAP SUCCESS or EAP FAILURE indications that is equal to the number of S-NSSAIs undergoing SSSA as indicated in the Registration Accept message 440).

The WTRU 401 may refrain from immediately accessing a Conditionally Allowed NSSAI until the corresponding SSSA has been performed.

The AMF 402 may maintain the signaling connection with the WTRU 401 to allow for the EAP messaging for the follow-on SSSA.

In step S450, the WTRU 401 performs SSSA using EAP authentication with a third-party AM-S 405 through the AMF 402 for at least one S-NSSAI subject to SSSA. The WTRU may do this for all the S-NSSAI subject to SSSA. The EAP messages may be exchanged between the WTRU 401 and the AMF 402 using secure Non-Access Stratum (NAS) transport messages. In parallel with the EAP messaging, the WTRU 401 may start using a S-NSSAI that is included in the Allowed NSSAI. For example, the WTRU 401 may request a PDU Session establishment for an Allowed S-NSSAI while concurrently performing EAP based authentication for another S-NSSAI subject to SSSA. This can enable the WTRU to access Allowed S-NSSAI that are not subject to SSSA without experiencing undue delay. If the allowed NSSAI also includes the S-NSSAIs subject to SSSA, the WTRU may not access the NSSAIs subject to SSSA until the SSSA for them is successfully completed.

If the WTRU 401 has not received an explicit list of S-NSSAIs for which SSSA will be run, the WTRU 401 may, based on a local configuration, determine to refrain from attempting any new Registration for a S-NSSAI subject to SSSA until all SSSA runs are completed. An example of local configuration of the WTRU may comprise the Configured NSSAI including for each S-NSSAI a flag indicating whether or not this S-NSSAI is subject to SSSA.

In an embodiment, the WTRU may determine that all SSSA runs are completed using the number of S-NSSAIs for which SSSA will be run, if indicated by the network in the Registration Accept message, as already described.

In an embodiment, the WTRU may refrain from attempting any new Registration for a S-NSSAI subject to SSSA until it has received from the network a specific message (e.g. an UE Configuration Update (UCU) message carrying a new Allowed message). This may be the case if the network only provides a simple indication (e.g. a flag) of follow-on SSSA runs, as already described.

In step S460, the WTRU 401 updates its allowed NSSAI to reflect the outcome of the one or more SSSAs performed in step S450. The AMF 402 may also update the allowed NSSAI of the WTRU 401.

The WTRU 401 may update its Allowed NSSAI autonomously based on the outcome of step S450. For example, the WTRU 401 may add (e.g. upon receiving an EAP SUCCESS message) a S-NSSAI to the allowed NSSAI list (e.g. by moving the S-NSSAI from the Conditionally Allowed NSSAI to the Allowed NSSAI) or remove (e.g. upon receiving an EAP FAILURE message) a S-NSSAI from the allowed NSSAI list. The WTRU 401 may also mark S-NSSAIs as "successfully authenticated" or "authentication failed" in the Allowed NSSAI.

Alternatively, the AMF 402 may update the Allowed NSSAI based on the result of the SSSA procedure in step S450 and update the WTRU's Allowed NSSAI using a UE Configuration Update (UCU) procedure.

During the SSSA authentication—for example as described with reference FIG. 4, step S450—the SSSA run may fail owing to various conditions (e.g. EAP timeout); i.e. SSSA authentication may fail for this same reason. The WTRU 401 may recover from such conditions, for example to determine if and when the WTRU 401 may re-attempt Registration for a S-NSSAI for which the SSSA failed because of such a condition.

In an embodiment, SSSA may be valid for a current Registration Area and Access Type provided by the AMF 402 with which the WTRU 401 has registered or valid for the entire PLMN. The validity information may be provided through WTRU configuration, e.g. as part of the Configured NSSAI referred to with reference to FIG. 2. The WTRU 401 may not be allowed to register to a S-NSSAI for which SSSA has failed until the WTRU 401 moves to a Registration Area different than the current Registration Area or to a new PLMN, depending on a SSSA scope configured in the WTRU (i.e., Registration area and Access Type or PLMN).

In an embodiment, the WTRU 401 may, upon reception of the Registration Accept message with an SSSA indication, start at least one SSSA timer for one or more S-NSSAI subject to SSSA. A SSSA timer may be used for all S-NSSAIs subject to SSSA, a single S-NSSAI subject to SSSA, or a set of S-NSSAIs subject to SSSA.

The WTRU 401 may receive a UCU message from the network before expiry of a timer.

In an embodiment, upon reception of the UCU message, the WTRU 401 may stop the SSSA timer(s) and may determine that the S-NSSAIs that are neither in the Allowed NSSAI nor the Rejected NSSAI received in the UCU message, but were previously received in the Conditionally Allowed NSSAI (in the Registration Accept message) had a SSSA run that failed (e.g. owing to EAP timeout). In other words, the WTRU may consider an S-NSSAI for which an SSSA run did not complete with a success (e.g. in UCU message Allowed NSSAI) or failure (e.g. in UCU message Rejected NSSAI) status from the network as failed because of some other condition(s). The WTRU 401 may mark the Conditionally Allowed NSSAI with an assumed or inferred or generic error cause (e.g. temporary error or timeout error). The WTRU 401 may start a registration timer that should expire before re-attempting a new Registration for those S-NSSAI(s).

In an embodiment, the UCU message may comprise a list of S-NSSAI that failed SSSA (e.g. due to EAP timeout). The WTRU 401 may stop at least the timer(s) for which all corresponding S-NSSAI(s) are indicated as failed. The WTRU 401 may, as in the previous embodiment, refrain from re-attempting a new Registration for those S-NSSAI(s) based on a timer.

In an embodiment, if the WTRU 401 is unaware of which S-NSSAIs were subject to SSSA (and therefore may have a failed SSSA run), the WTRU 401 may stop the SSSA timer(s). The WTRU 401 may start a timer that should expire before re-attempting a new Registration for any S-NSSAI that are not in the Allowed NSSAI nor Rejected NSSAI in the UCU message.

It may also happen that one or more SSSA timer(s) expire, e.g. before reception of a UCU message.

In an embodiment, the WTRU 401 may determine that the S-NSSAIs, which are in the Conditionally Allowed NSSAI and which correspond to an expired timer, had a SSSA run that failed (e.g. owing to EAP timeout). The WTRU 401 may mark these S-NSSAI(s) with an error cause (e.g. temporary error or timeout error) and the WTRU 401 may start a timer that should expire before re-attempting a new Registration for these S-NSSAI(s).

In an embodiment, if the WTRU 401 is not aware of which S-NSSAIs were subject to SSSA, the WTRU 401 may start a timer that should expire before re-attempting a new Registration for any S-NSSAI that are neither in the Allowed NSSAI nor the Rejected NSSAI (from the Registration Accept message).

Figure 5:
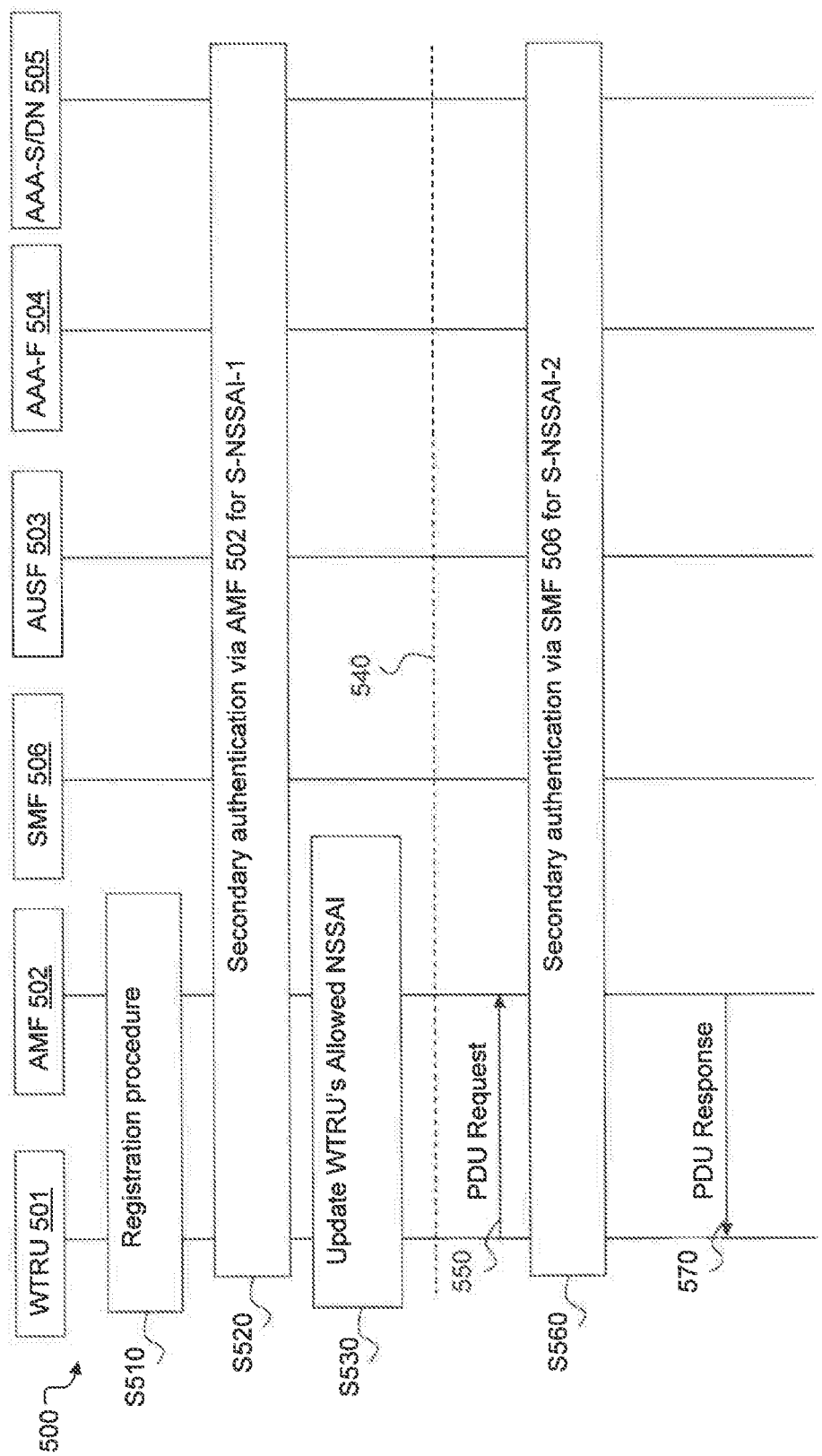
FIG. 5 is a flowchart for an authentication method according to an embodiment.

FIG. 5 is a flowchart for an exemplary embodiment of an authentication method 500 according to an embodiment, which can be said to unify the Registration-based method 400 illustrated in FIG. 4 and a variant of the PDU Session-based method 200 illustrated in FIG. 2. The authentication method 500 may provide SSSA on-demand capability while addressing the issue of wasteful SSSA signalling.

In the method 500, the AMF 502 may determine whether to authorize access via the AMF 502 (i.e. Registration-based SSSA, generally as described in FIG. 4) or a SMF 506 (i.e. PDU Session-based SSSA, generally as described in FIG. 3). This determination may be based on UE capability (e.g. SSSA capability, SMS only), subscription information and operator policy as will be described.

Devices capable of SMS over NAS may be required by the network to do Registration-based SSSA only (when applicable) before accessing any network service.

Devices may be allowed by the network to mix Registration-based and PDU session-based SSSA to offer a certain deployment flexibility in terms of SSSA on-demand (see for example the illustrative example in FIG. 5).

Other devices may be required to perform only PDU session-based SSSA. This could be useful in order to offer a certain backward compatibility with Release 15 UEs that support existing secondary authentication by a DN-AAA server. For example, based on the method in FIG. 3, the network may run SSSA steps (and skip optional DNN authentication steps), which could make the slice EAP authentication by a third-party AAA in a Data Network (DN) transparent to a Release 15 UE.

As mentioned, FIG. 5 illustrates an exemplary embodiment of an authentication method 500 that can enable a mix of SSSA via AMF 502 and SMF 506. An illustrative scenario may be that of a WTRU as a surveillance/monitoring IoT device that periodically sends out small amounts of data, e.g. for "keep alive" or "nothing to report" messaging purposes. Alternatively or in addition, the WTRU may sometimes send an alert message to the DN when a significant condition or event is detected, e.g. motion is detected. The WRTU may be requested by Mobile Terminated data from the DN to send out additional, larger data chunks that may require UP connectivity, e.g. recorded footage. The smaller data messages are sent over NAS, the service being offered via S-NSSAI-1. The WTRU may transmit the larger data chunks over UP connectivity, the service being offered via S-NSSAI-2. In this scenario such devices are expected to send small data units periodically but only a small subset is expected to send bigger data chunks under certain conditions. Enabling more flexibility on the type of SSSA (during Registration or PDU Session establishment) allows more efficient sharing of resources among devices and also allows for more control by the network/third party to provide slice access authorization only when needed (i.e. on-demand SSSA).

The method illustrated in FIG. 5 is described using an example with two S-NSSAI for the sake of clarity of illustration, but it will be understood that the scenario can be applied to any number of S-NSSAI (e.g. up to 8—a maximum set by the present implementation of an underlying standard) and any combination of SSSA types (via AMF, via SMF, "none").

As mentioned, in the example, the WTRU 501 is configured with two S-NSSAI which are subject to SSSA. S-NSSAI-1 is used periodically for Data over NAS; S-NSSAI-2, used rarely, is for User Plane (UP) traffic. To access S-NSSAI-1, the WTRU 501 needs to authenticate with a third-party AM-S 505 via the 502 AMF (i.e. before using Data over NAS). To access S-NSSAI-2, the WTRU 501 needs to authenticate with a third-party MA-S via the SMF 506 (e.g. when requesting PDU Session establishment). It will be understood that the WTRU 501 may also be configured with further S-NSSAI(s) not subject to SSSA.

During the Registration procedure, step S510, following the WTRU primary authentication with AUSF 503/UDM, the AMF 502 may retrieve slice subscription information related to S-NSSAI-1 and S-NSSAI-2. Subscription information may carry information related to the SSSA type for a given S-NSSAI, i.e. in the example S-NSSAI-1 is via AMF 502, S-NSSAI-2 is via SMF 506, while the SSSA type of other S-NSSAI's may be "none"). EAP authentication for S-NSSAI-1, which involves the AMF 502, may be postponed based on AMF decision as illustrated in FIG. 4. S-NSSAI-2 may be included into the Allowed NSSAI in the Registration Accept message whereas S-NSSAI-1 may be excluded from it. Essentially, by including S-NSSAI-2 into the Allowed NSSAI the network indicates to the UE that it may initiate a PDU Session procedure using S-NSSAI-2 during which a PDU Session based SSSA may be performed (i.e. on-demand SSSA). By including S-NSSAI-2 in the Allowed NSSAI the network may preserve the definition and how the Allowed NSSAI is being used by the UE in Release 15, wherein only S-NSSAI that are included in the set of allowed S-NSSAIs may be used in a given Registration Area. In order for the WTRU to use S-NSSAI(s) that are not in the Allowed NSSAI, the WTRU would need to request access to these S-NSSA through a new Registration procedure. Including S-NSSAI-2 in the Allowed NSSAI thus enables the WTRU to request a Secondary Authentication procedure, without having to trigger a new system Registration Procedure. Alternatively, the AMF 502 may include both S-NSSAIs in the new special set (list), Conditionally Allowed NSSAI. The AMF 502 may move S-NSSAIs subject to SSSA from the Conditionally Allowed NSSAI list to the "Allowed NSSAI" if SSSA (via AMF or SMF) is successful, and to "Rejected NSSAI" in case SSSA fails, based on network policy.

In step S520, the WTRU 501 is authenticated for S-NSSAI-1 via the AMF 502 as illustrated in FIG. 4, step S450, and S-NSSAI-1 is added, in step S530, to the WTRU's Allowed NSSAI as illustrated in FIG. 4, step S460. The WTRU 501 may then set up a PDU Session for small Data over NAS using S-NSSAI-1 and start sending (infrequent) small data packets 540 to the DN.

During the time when the small data packets are sent, the WTRU 501 may be triggered to start using S-NSSAI-2. For example, the trigger may be a combination of an event locally detected by the WTRU 501, a message from the DN requesting upload of the bigger data units related to the event reported by the WTRU 501, etc. The message may carry an authorization token that the WTRU 501 is required to send to the DN in the following SSSA steps prior to the big data upload.

The WTRU 501 then sends a PDU Session establishment request 550 using S-NSSAI-2. The AMF 502 detects that S-NSSAI-2, which is provided by the WTRU 501 in the PDU Session establishment request 550, requires SSSA as previously determined (e.g. S-NSSAI-2 is in the Conditionally Allowed NSSAI list). When forwarding the request to the SMF 506, the AMF 502 provides an indication instructing the SMF 506 to perform SSSA. However, if S-NSSAI-2 is already in the Allowed NSSAI the AMF 502 may omit the indication or alternatively the indication may specify that the WTRU 501 is already authenticated for S-NSSAI-2.

In step S560, the WTRU 501 is authenticated via SMF 506 by the third-party AAA-S. The SMF 506 may skip authentication if the WTRU 501 has already been authenticated for the slice (i.e. based on indication from the AMF 502). If authentication is required, during the EAP message exchange with the AAA-S server the WTRU 501 may be requested to provide a proof of authorization (e.g. token received from previous step) in order to be authorized to send data using S-NSSAI-2. The AAA-S server may send additional EAP messages to SMF 506 indicating the authorization scope (e.g. byte count, time). The authorization may be revoked at the SMF 506 and the PDU Session may be disconnected accordingly. The SMF 506 may inform the AMF 502 of successful WTRU authentication with third-party MA-S for S-NSSAI-2. The AMF 502 may update the Allowed NSSAI to include S-NSSAI-2 and may optionally update WTRU's Allowed NSSAI accordingly using a UCU procedure (e.g. the AMF 502 may skip the UCU steps for a Release 15 WTRU). Similarly, the SMF 506 may inform the AMF 502 of a failed authentication for the S-NSSAI. In that case, the AMF 502 may update the Rejected NSSAI to include S-NSSAI-2 based on policy (e.g. after x failed attempts) and update the WTRU 501 via a UCU procedure.

The WTRU 501 receives a PDU Session establishment response S570 authorizing (or not) upload of big data over UP. The WTRU 501 may then transmit the data as per DN request.

If the SMF 506 at some point determines to release the PDU Session owing to reasons other than authentication failure/rejection (e.g. byte count or time limit reached), the SMF 506 may notify the AMF 502. For example, the WTRU 501 may be required to re-authenticate for S-NSSAI-2 to re-establish PDU session after expiry of the authorization scope. In that case, the AMF 502 may remove S-NSSAI-2 from the Allowed NSSAI (e.g. move it back to the Conditionally Allowed NSSAI list) until the next successful SSSA for S-NSSAI-2.

The AAA-S 505 server may revoke authorization through SMF 506 at any time (e.g. user account not valid anymore). The SMF 506 may inform the AMF 502, which then may include S-NSSAI-2 in the Rejected NSSAI (or Conditionally Allowed NSSAI) based on network policy.

FIG. 6 and FIG. 7 illustrate different solutions for updating the Allowed NSSAI in the WTRU and the AMF, while performing SSSA related procedures such as described in FIG. 4. FIG. 6 may correspond to updating a WTRU compliant with 5G Release 16 and FIG. 7 may correspond to updating a WTRU compliant with 5G Release 15. As shown, the AMF may also maintain a Conditionally Allowed NSSAI list, already described, to keep track of which S-NSSAI require SSSA (via AMF/SMF). As illustrated in the Configured NSSAI (at the WTRU) in both figures, the WTRU in FIG. 6 may support S-NSSAI with SSSA via SMF or AMF, while the WTRU in FIG. 7 may only support SSSA via SMF (e.g. reusing messages and interfaces from Secondary Authentication by a DN procedure defined in Release 15).

In FIG. 6, the Configured NSSAI for the WTRU includes S-NSSAI-1 with SSSA via AMF, S-NSSAI-2 with SSSA via SMF, and S-NSSAI-3 for which no SSSA is required.

After the initial Registration procedure 610, the Allowed NSSAI at both the WTRU and the AMF includes S-NSSAI-3, while the Conditionally Allowed NSSAI ("Conditional NSSAI" in the FIGS.) in the AMF includes S-NSSAI-1 and S-NSSAI-2 (as no SSSA has been performed for them). The Allowed NSSAI at the WTRU also includes S-NSSAI-2 as a PDU Session based SSSA will be performed by the WTRU only at the time the WTRU needs to connect to that slice (see following steps).

Then, after SSSA via AMF for S-NSSAI-1 620, the Allowed NSSAI at WTRU includes S-NSSAI-2 and S-NSSAI-3, while the Allowed NSSAI at the AMF now includes S-NSSAI-3 and S-NSSAI-1, where the latter has been removed from the Conditionally Allowed NSSAI, which now includes only S-NSSAI-2.

During an optional UCU procedure 630 or alternatively directly following the completion of the SSSA procedure via AMF, Allowed NSSAI at the WTRU is updated to include also S-NSSAI-1, with no change at the AMF.

Then, during SSSA via SMF for S-NSSAI-2 640, the Allowed NSSAI at the AMF is updated to include also S-NSSAI-2, which is removed from the Conditionally Allowed NSSAI.

Alternatively to FIG. 6, the WTRU may also maintain locally a Conditionally Allowed NSSAI list which may be received in a Registration accept message or an UCU command and/or updated to be included in the Allowed NSSAI following a message from the AMF (e.g. Registration Accept, UCU Command, Successful EAP authentication). Moreover, when the WTRU detects that access to a slice requires SSSA via SMF, the WTRU may provide the User identity directly in the PDU Session request message, thus avoiding a EAP identity round-trip during PDU Session establishment.

In FIG. 7, the Configured NSSAI for the WTRU includes S-NSSAI-2 with Secondary authentication by DN, and S-NSSAI-3 for which no SSSA is required.

After the initial Registration procedure 710, the Allowed NSSAI at both the WTRU and the AMF includes S-NSSAI-3, while the Conditionally Allowed NSSAI in the AMF includes S-NSSAI-2 (as no SSSA has been performed for them). The Allowed NSSAI at the WTRU also includes S-NSSAI-2 as Secondary Authentication by DN/SSSA will be performed by the WTRU only at the time the WTRU needs to connect to the DN.

Then, after Secondary Authentication by DN/SSSA 720, the Allowed NSSAI at the AMF now includes S-NSSAI-3 and S-NSSAI-2, where the latter has been removed from the Conditionally Allowed NSSAI, which then is empty.

Figure 8:
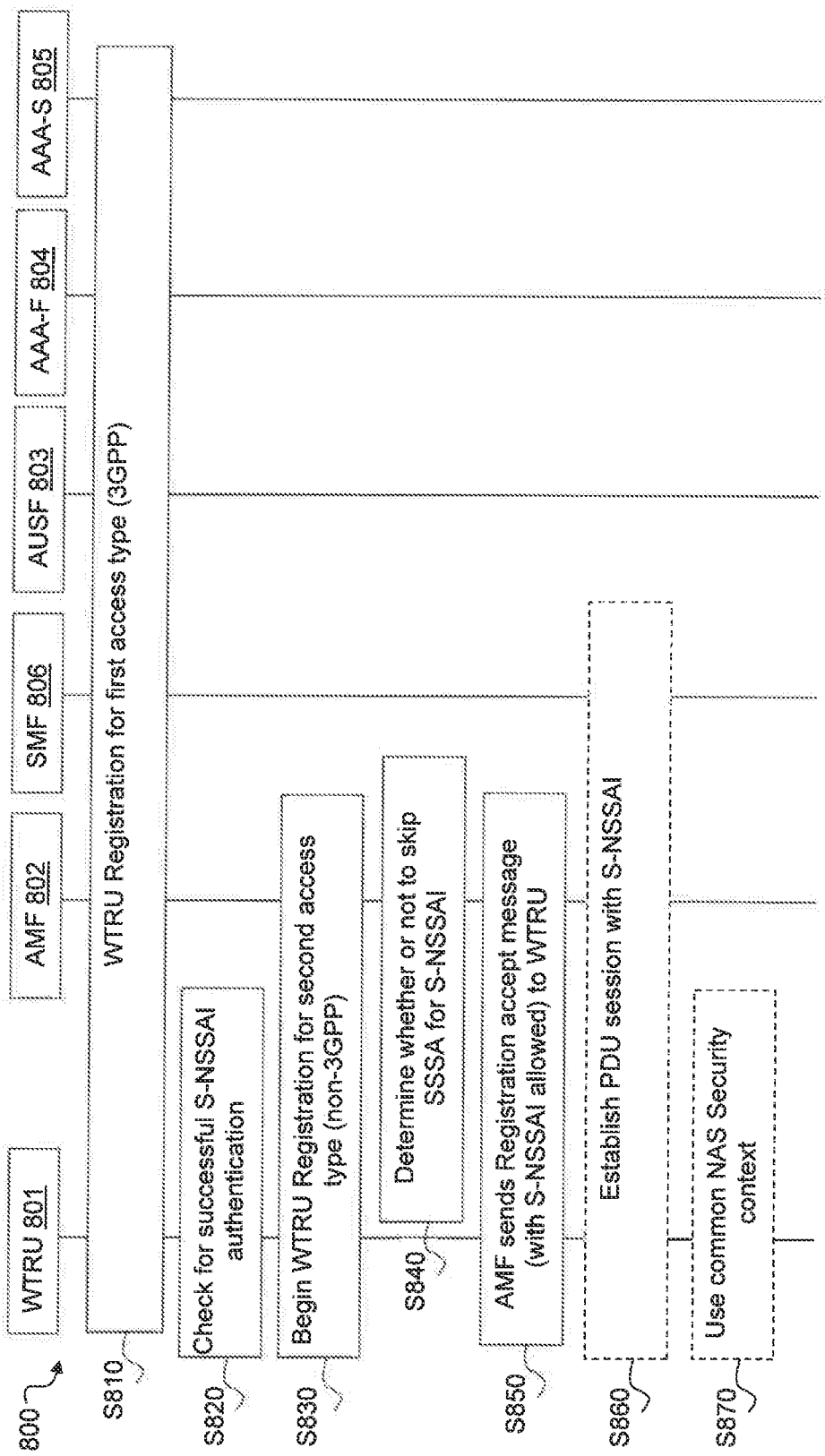
FIG. 8 is a flowchart for an authentication method according to an embodiment.

FIG. 8 is a flowchart for an authentication method 800 for SSSA. The authentication method 800 may be used, for example, when registering to both 3GPP and non-3GPP accesses for a slice, S-NSSAI, that requires SSSA.

A WTRU 801 may perform a 3GPP Registration procedure with an AMF 802 (S810). The WTRU 801 may perform slice authentication for the slice, S-NSSAI, e.g. as described in connection with any of FIG. 4 and FIG. 5.

The WTRU may check whether authentication for the S-NSSAI was successful during the Registration procedure over 3GPP access (S820). In an embodiment, this check or verification (e.g. verification procedure), for example, may be performed by searching for the S-NSSAI in the Allowed NSSAI list for the 3GPP access. If the S-NSSAI is included in this list, then the authentication was (or is at least deemed) successful.

In an embodiment, the WTRU 801 may search for the S-NSSAI in the Conditionally Allowed NSSAI list. If the S-NSSAI is in this list, then the WTRU 801 may wait (e.g. determine to wait and wait accordingly) for the outcome of the corresponding SSSA, e.g. in step S450 in FIG. 4 or in step S560 in FIG. 5, (in other words, the EAP result) before beginning the Registration procedure for non-3GPP access.

In an embodiment, the verification may be made by referring to and/or examining key material (e.g. session keys) produced as a result of the slice authentication. The key material may be included by the WTRU 801 in the NAS Security Context (e.g. as defined in and/or in accordance with section 3.1 of 3GPP Technical Specification Group Services and System Aspects; Security Architecture and Procedures for 5G System) for 3GPP access. In an embodiment, WTRU 801 may wait (e.g., make a determination to wait and wait accordingly) for completion of a UCU procedure (e.g. in step S460 in FIG. 4) and/or for completion of a subsequent Registration over 3GPP access, e.g., if a change of AMF (i.e. AMF relocation, for instance) is needed due to the SSSA procedure.

Upon determination that the WTRU 801 has been successfully authenticated for the S-NSSAI, the WTRU 801 may proceed with the non-3GPP Registration procedure. In an embodiment, the WTRU 801 may proceed with the Registration procedure when the S-NSSAI has been on the list of Conditionally Allowed NSSAI for a period of time ("time period"). This time period may be signaled and/or configured, and may be implemented using a timer. The time period may start, for example, at reception of a Registration accept message). In an embodiment, the WTRU may proceed with the Registration procedure when the S-NSSAI is in the Rejected NSSAI list.

The WTRU 801 may begin the Registration procedure for non-3GPP access (S830). The WTRU 801 may begin such registration procedure at least in part by any of generating a Registration Request message and sending the Registration Request message over the non-3GPP access. The Registration Request message may include an indication or otherwise indicate that SSSA for that S-NSSAI may be omitted. The indication may be included in a security capability IE and/or in a different IE of the Registration Request message. The indication may be sent on a per S-NSSAI basis for which the SSSA has already been successfully performed over the 3GPP access.

After the AMF 802 receives the indication from the WTRU 801, the AMF 802 may determine to omit SSSA for that particular S-NSSAI (S840). In an embodiment, the AMF 802 may determine to skip the SSSA without the indication from the WTRU 801. The AMF 802 may do so, for example, based on other information that a particular S-NSSAI has already been authenticated by an external AAA server 804 over the 3GPP access. In an embodiment, the AMF 802 may determine to ignore the indication and proceed with SSSA even though the SSSA has already been performed over the 3GPP access.

The AMF 802 may send a Registration Accept message to the WTRU 801 (S850) The Registration Accept message may include an indication or otherwise indicate that the S-NSSAI is Allowed over non-3GPP. Such indication, for example, may indicate that the S-NSSAI is available to be used by the WTRU 801, that the WTRU 801 does not need to wait for further messages regarding the secondary authentication (SSSA) for this S-NSSAI, or a combination of the two. The indication may be sent by the AMF 802 in a Registration Accept message on a per S-NSSAI basis.

After reception of the Registration Accept message (with the indication), the WTRU 801 may proceed with the establishment of a PDU session with this S-NSSAI, if required (S860). The WTRU 801 may begin using the common NAS security context for both 3GPP and non-3GPP access in which the WTRU 801 may include any key material for this S-NSSAI (S870). The key material for this S-NSSAI may be, for example, session keys obtained through the SSSA run over the 3GPP access.

Figure 9:
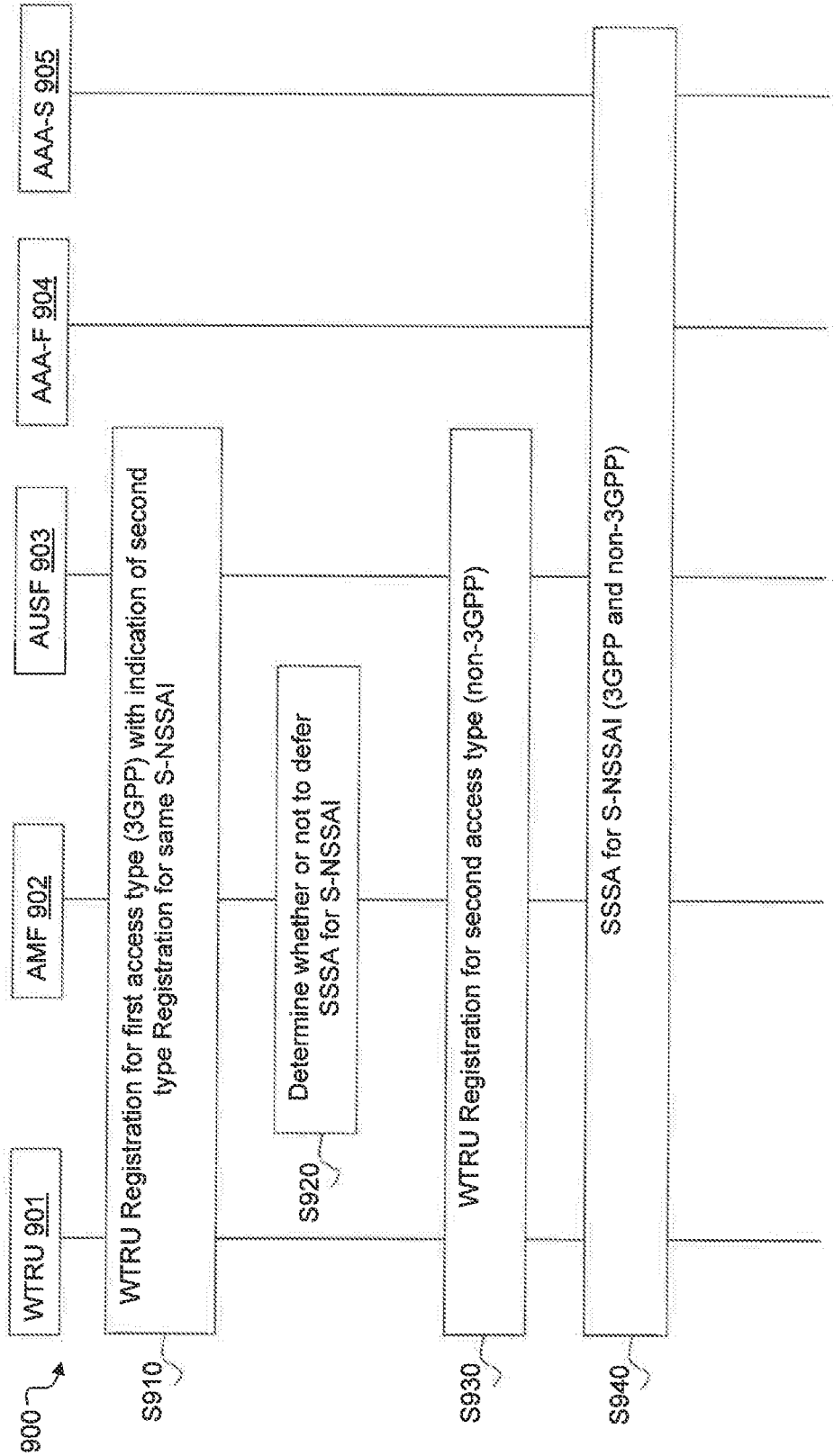
FIG. 9 is flowchart for an authentication method according to an embodiment.

FIG. 9 is a flowchart for an embodiment of an authentication method 900 for SSSA when registering to both 3GPP and non-3GPP accesses for a slice, S-NSSAI, that requires SSSA.

The WTRU 901 may indicate during 3GPP registration (e.g. in a message) that it may perform non-3GPP registration with the same S-NSSAI as the one or ones indicated by the WTRU 801 during the 3GPP registration (S910). The AMF 902 may defer the 3GPP SSSA (S920) until after the second registration of the WTRU 901 with the same S-NSSAI over the non-3GPP access (S930). After completion of the successful registration over non-3GPP access, the AMF 902 may initiate the SSSA, which may be performed simultaneously for the 3GPP access and the non-3GPP access (S940). The AMF 802 can defer the 3GPP SSSA owing to the indication sent by the WTRU 901 in a Registration Request message sent during the 3GPP Registration (S910) to inform the AMF 902 that there is a follow up Registration over the non-3GPP access with one (or more) of the same S-NSSAIs.

The embodiments illustrated in FIGS. 8 and 9 have been described with the 3GPP registration being performed before the non-3GPP registration. It should be understood that these embodiments can be performed the other way around, with the non-3GPP registration preceding the 3GPP registration.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method for operation by a wireless transmit/receive unit, WTRU, the method comprising:
   receiving a message indicating successful registration of the WTRU and further including a first list of slices for which slice-specific authentication and authorization for slice access, SSSA, is required after registration, and a second list of at least one currently allowed slice; and
   performing, after successful registration of the WTRU, at least one SSSA for accessing a first slice included in the first list of slices included in the received message.

2. The method of claim 1, further comprising:
   performing SSSA for at least one further slice in the list of slices for which SSSA is required; and
   accessing the at least one further slice after successful SSSA.

3. The method of claim 2, further comprising:
   receiving a message indicating successful SSSA of the at least one further slice.

4. The method of claim 3, further comprising:
   upon reception of the message indicating successful SSSA of the at least one further slice, updating a stored list of slices for which the WTRU is allowed access to include the at least one further slice.

5. The method of claim 1, wherein the SSSA for the first slice is for accessing the first slice over a first access type, the method further comprising:
   determining that a SSSA is being performed for the first slice over the first access type and waiting for an outcome of the SSSA for the first slice over the first access type before beginning a registration procedure for the first slice over a second access type.

6. The method of claim 5, wherein the first access type is 3GPP access or non-3GPP access.

7. The method of claim 6, wherein the second access type is non-3GPP access in case the first access type is 3GPP access, and 3GPP access in case the first access type is non-3GPP access.

8. The method of claim 7, wherein the non-3GPP access is to a Wireless Local Area Network.

9. The method of claim 1, wherein the message further comprises a list of slices for which the WTRU is allowed access including at least one slice for which a previous SSSA was successfully executed and for which the WTRU is allowed access regardless of access type.

10. The method of claim 1, further comprising maintaining the list of slices for which SSSA is needed for access by the WTRU.

11. The method of claim 10, further comprising updating the list of slices for which SSSA is required based on a result of a SSSA for a slice included in the list.

12. The method of claim 1, wherein the WTRU refrains from accessing slices for which SSSA is required until a corresponding SSSA has been performed successfully.

13. The method of claim 1, wherein the WTRU refrains from accessing slices until after reception from the network of a specific message that access is allowed.

14. A wireless transmit/receive unit, WTRU, comprising:
memory for storing processor-executable instructions; and
at least one processor configured to execute the processor-executable instructions to:
receive a message indicating successful registration of the WTRU and including a first list of slices for which slice-specific authentication and authorization for slice access, SSSA, is required after registration, and a second list of at least one currently allowed slice; and
perform, after successful registration of the WTRU, at least one SSSA for accessing a first slice included in the first list of slices included in the received message.

15. The WTRU of claim 14, wherein the SSSA for the first slice is for accessing the first slice over a first access type, and wherein the at least one processor is further configured to execute the processor-executable instructions to:
determine that a SSSA is being performed for the first slice over the first access type and wait for an outcome of the SSSA for the first slice over the first access type before beginning a registration procedure for the first slice over a second access type.

16. The WTRU of claim 15, wherein the at least one processor is further configured to execute the processor-executable instructions to update the list of slices for which SSSA is required based on a result of a SSSA for a slice included in the list.

17. The WTRU of claim 15, wherein the first access type is 3GPP access or non-3GPP access.

18. The WTRU of claim 17, wherein the second access type is non-3GPP access in case the first access type is 3GPP access, and 3GPP access in case the first access type is non-3GPP access.

19. The WTRU of claim 18, wherein the non-3GPP access is to a Wireless Local Area Network.

20. The WTRU of claim 14, wherein the message further comprises a list of slices for which the WTRU is allowed access includes at least one slice for which a previous SSSA was successfully executed and for which the WTRU is allowed access regardless of access type.

21. The WTRU of claim 14, wherein the at least one processor is further configured to execute the processor-executable instructions to:
perform SSSA for at least one further slice in the list of slices for which SSSA is required; and
access the at least one further slice after successful SSSA.

22. The WTRU of claim 21, wherein the at least one processor is further configured to execute the processor-executable instructions to receive a message indicating successful SSSA of the at least one further slice.

23. The WTRU of claim 22, wherein the at least one processor is further configured to execute the processor-executable instructions to, upon reception of the message indicating successful SSSA of the at least one further slice, update a stored list of slices for which the WTRU is allowed access to include the at least one further slice.

24. The WTRU of claim 14, wherein the at least one processor is further configured to execute the processor-executable instructions to maintain the list of slices for which SSSA is required.

25. The WTRU of claim 14, wherein the at least one processor is further configured to execute the processor-executable instructions to refrain from accessing slices for which SSSA is required until a corresponding SSSA has been performed successfully.

26. The WTRU of claim 14, wherein the at least one processor is further configured to execute the processor-executable instructions to refrain from accessing slices until after reception from the network of a specific message that access is allowed.

27. A method for operation by an Access and Mobility management Function, AMF, the method comprising:
provide to a wireless transmit/receive unit, WTRU a message indicating successful registration of the WTRU and including a first list of slices for which SSSA is required after registration, and a second list of at least one currently allowed slice; and
initiating, after successful registration of the WTRU, at least one SSSA for accessing a first slice included in the first list of slices included in the provided message.

28. The method of claim 27, wherein the message further comprises a list of slices for which the WTRU is allowed further includes at least one slice for which a previous SSSA was successfully executed and for which the WTRU is allowed access regardless of access type.

29. The method of claim 27, wherein the AMF determines to skip SSSA for a slice for which a previous SSSA was successfully executed regardless of access type.

* * * * *